Figure 1:
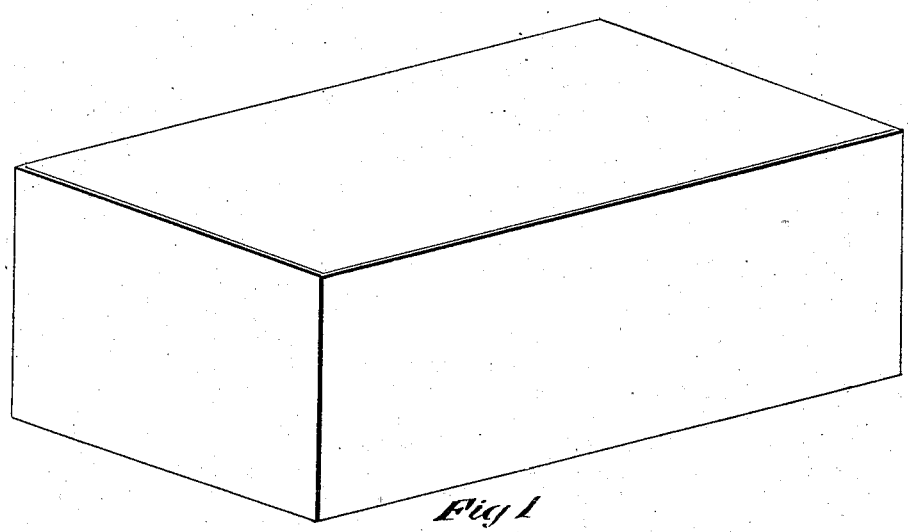

J. K. CALDWELL.
Brick, and the Art of Making the Same.

No. 217,057.              Patented July 1, 1879.

UNITED STATES PATENT OFFICE.

JOHN K. CALDWELL, OF PHILADELPHIA, PENNSYLVANIA.

IMPROVEMENT IN BRICKS AND THE ART OF MAKING THE SAME.

Specification forming part of Letters Patent No. 217,057, dated July 1, 1879; application filed December 6, 1878.

*To all whom it may concern:*

Be it known that I, JOHN K. CALDWELL, of Philadelphia, in the county of Philadelphia and State of Pennsylvania, have invented certain new and useful Improvements in Bricks and in the Art of Coloring Bricks; and I do hereby declare the following to be a full, clear, and exact description of the invention, such as will enable others skilled in the art to which it pertains to make and use it, reference being had to the accompanying drawing, which forms part of this specification, in which the figure is a perspective of a brick illustrating my invention.

My invention has for its object to utilize clay not heretofore considered adapted to the manufacture of faced or re-pressed bricks on account of its lacking the property of burning to a desired color.

My invention consists in applying to the surface of unburned bricks of such clay a coating of clay of a desirable color, or which will burn to such color, said coating being in a semi-liquid form, and the brick, after the application of the coating and the partial drying, being re-pressed to set the color and incorporate the coating with the body of the brick, and then dried and burned in the usual manner.

The great advantage of this improvement consists in the fact that a large saving in the expense of transporting bricks of a desirable color may be effected, it being only necessary, by means of this invention, to transport enough clay to make a surface or coating for the body of a brick composed of clay of a different shade or color, the latter being found in the place where the manufacture is carried on.

I am aware that bricks having a surface or coating of a different color from the body or an exterior glaze are not new. Such glazing has, however, been obtained by the use of lead, and the coloring, where no glazing took place, by the employment of metallic substances.

My invention is, however, distinguishable from these in that it does not have the effect of glazing the bricks, and that no metallic coloring-matter is employed, the surface or coating being merely brick-clay, applied in a semi-liquid form to unburned molded bricks, the latter being pressed after the coating is applied, so as to set the color and incorporate it with the body of the clay, and then burned.

I am also aware that it is not new to apply a surface-coating of clay of a certain consistency which will adhere to the body of the brick as a plastic veneer.

I am further aware that sand or dust has been used as a coating for bricks to facilitate the removal of the latter from the mold, and, in some cases, to impart color to the surface of the bricks. Such dusting, however, is generally very thin, and frequently so little of the dust or sand adheres that the color of the brick is not uniform, but spotted.

In my invention, however, the coating is laid on in a semi-liquid form to a greater depth or extent than is possible with dry dust, and may be applied so evenly as to secure a perfectly uniform color for the surface or building-face of the brick.

I do not wish to be understood as claiming, broadly, the application to the surface of a pressed and partly-dried brick of a plastic or semi-fluid coating, but limit myself to the employment of a semi-fluid coating which will produce a brick-red surface, and include as an essential step in my process the re-pressing of the brick after coating, whereby the surface will become incorporated with the body of the brick.

Said coating may be applied to one or more faces of the brick, as desired.

What I claim as my invention is—

1. The improvement in the art of coloring the exposed face or faces of re-pressed bricks herein described, consisting in applying to said face or faces of a molded unburned brick a paint of semi-fluid brick-clay of a different shade or color, pressing the brick to set the coloring-matter and incorporate the coating with the body, and then burning, as set forth.

2. As a new article of manufacture, a brick having a surface of clay of a different shade or color from the body, said surface being set and incorporated with the body, substantially as set forth.

In testimony that I claim the foregoing I have hereunto set my hand this 4th day of December, 1878.

JOHN K. CALDWELL.

Witnesses:
S. J. VAN STAVOREN,
CHAS. F. VAN HORN.